United States Patent
Bell et al.

(10) Patent No.: US 8,031,262 B2
(45) Date of Patent: Oct. 4, 2011

(54) DETERMINING A FINAL EXPOSURE SETTING AUTOMATICALLY FOR A SOLID STATE CAMERA WITHOUT A SEPARATE LIGHT METERING CIRCUIT

(75) Inventors: Cynthia S. Bell, Chandler, AZ (US); Edward P. Tomaszewski, Phoenix, AZ (US); Amy E. Hansen, San Jose, CA (US); Kannan Raj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/851,235

(22) Filed: Aug. 5, 2010

(65) Prior Publication Data

US 2010/0315531 A1    Dec. 16, 2010

Related U.S. Application Data

(63) Continuation of application No. 12/146,218, filed on Jun. 25, 2008, now Pat. No. 7,817,206, which is a continuation of application No. 10/304,838, filed on Nov. 25, 2002, now Pat. No. 7,403,222, which is a continuation of application No. 09/294,851, filed on Apr. 20, 1999, now Pat. No. 6,486,915.

(51) Int. Cl.
  H04N 5/228     (2006.01)
  H04N 5/235     (2006.01)
  G03B 7/00      (2006.01)

(52) U.S. Cl. .................. 348/362; 348/222.1; 348/229.1

(58) Field of Classification Search ............... 348/222.1, 348/229.1, 230.1, 362–366; 396/213, 222, 396/236; 382/168–172, 254, 274
See application file for complete search history.

(56) References Cited

U.S. PATENT DOCUMENTS

| | | | |
|---|---|---|---|
| 4,329,029 A | 5/1982 | Haskell |
| 4,635,126 A | 1/1987 | Kinoshita |
| 4,748,506 A | 5/1988 | Hieda |
| 5,053,888 A | 10/1991 | Nomura |
| 5,146,258 A | 9/1992 | Bell et al. |
| 5,194,960 A | 3/1993 | Ota |
| 5,309,243 A | 5/1994 | Tsai |
| 5,376,964 A | 12/1994 | Soga et al. |
| 5,450,502 A | 9/1995 | Eschbach et al. |
| 5,544,258 A | 8/1996 | Levien |

(Continued)

FOREIGN PATENT DOCUMENTS

EP    0528433    2/1993

(Continued)

OTHER PUBLICATIONS

Non-Final Office Action (dated Dec. 12, 2005), U.S. Appl. No. 10/304,838, filed Nov. 25, 2002, First Named Inventor: Cynthia S. Bell, (12 pages).

(Continued)

Primary Examiner — David Ometz
Assistant Examiner — Richard Bemben
(74) Attorney, Agent, or Firm — Blakely, Sokoloff, Taylor & Zafman LLP

(57) ABSTRACT

An embodiment of the invention is a method of generating a final exposure setting, including, (a) selecting one of a number of predetermined exposure settings as a current exposure setting for a solid state camera having a camera imager, (b) generating a captured scene by the camera imager using the current exposure setting, (c) selecting according to an automated search methodology another one of the exposure settings to be the current setting in response to the captured scene being underexposed or overexposed, and, (d) repeating (b) and (c) until the captured scene is neither underexposed or overexposed.

21 Claims, 5 Drawing Sheets

U.S. PATENT DOCUMENTS

| | | | |
|---|---|---|---|
| 5,745,808 | A | 4/1998 | Tintera |
| 5,751,354 | A | 5/1998 | Suzuki et al. |
| 6,486,915 | B2 | 11/2002 | Bell et al. |
| 6,630,960 | B2 | 10/2003 | Takahashi et al. |
| 6,952,233 | B2 | 10/2005 | Nagano |
| 7,053,954 | B1 | 5/2006 | Canini |
| 2001/0013903 | A1 | 8/2001 | Suzuki et al. |

FOREIGN PATENT DOCUMENTS

| | | |
|---|---|---|
| JP | 60204181 | 10/1985 |
| JP | 5056341 | 3/1993 |
| JP | 6098167 | 4/1994 |
| JP | 7038801 | 2/1995 |
| JP | 7303205 | 11/1995 |
| JP | 9065074 | 3/1997 |

OTHER PUBLICATIONS

Final Office Action (dated May 30, 2006), U.S. Appl. No. 10/304,838, filed Nov. 25, 2002, First Named Inventor: Cynthia S. Bell, (13 pages).

Non-Final Office Action (dated Oct. 17, 2006), U.S. Appl. No. 10/304,838, filed Nov. 25, 2002, First Named Inventor: Cynthia S. Bell, (13 pages).

Non-Final Office Action (dated Jun. 19, 2007), U.S. Appl. No. 10/304,838, filed Nov. 25, 2002, First Named Inventor: Cynthia S. Bell, (10 pages).

Final Office Action (dated Dec. 13, 2007), U.S. Appl. No. 10/304,838, filed Nov. 25, 2002, First Named Inventor: Cynthia S. Bell, (6 pages).

Non-Final Office Action (dated 12/11/09), U.S. Appl. No. 12/146,218, filed Jun. 25, 2008, First Named Inventor: Cynthia S. Bell, (10 pages).

Non-Final Office Action (dated Apr. 24, 2001), U.S. Appl. No. 09/294,851, filed Apr. 20, 1999, First Named Inventor: Cynthia S. Bell, (12 pages).

Final Office Action (dated Oct. 10, 2001), U.S. Appl. No. 09/294,851, filed Apr. 20, 1999, First Named Inventor: Cynthia S. Bell, (10 pages).

Non-Final Office Action (dated Mar. 27, 2002), U.S. Appl. No. 09/294,851, filed Apr. 20, 1999, First Named Inventor: Cynthia S. Bell, (11 pages).

Kuno, Tetsuya, et al., "A New Automatic Exposure System for Digital Still Cameras", IEEE Transactions on Consumer Electronics, Feb. 1998, IEEE, USA vol. 44, No. 1, (pp. 192-199).

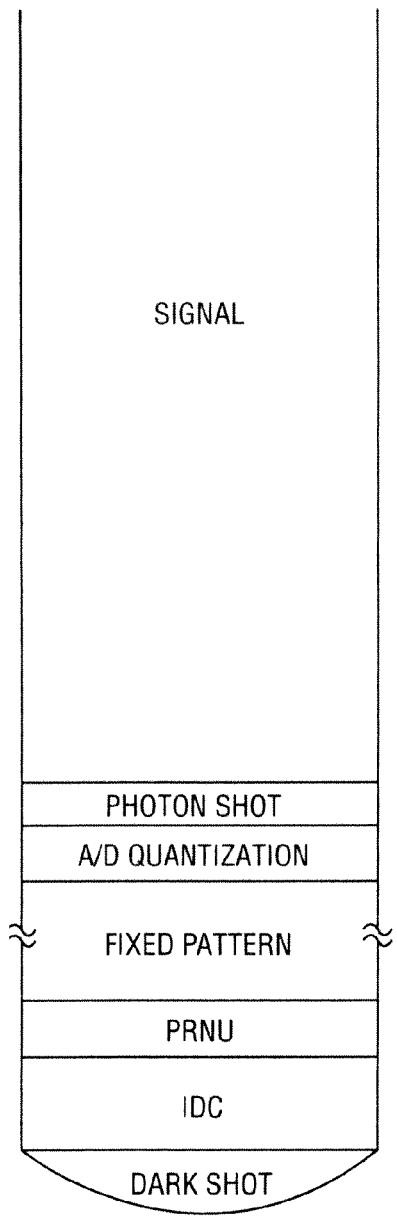
FIG. 7
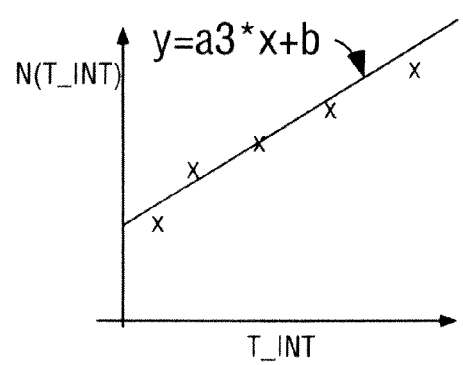
FIG. 8
FIG. 9

DETERMINING A FINAL EXPOSURE SETTING AUTOMATICALLY FOR A SOLID STATE CAMERA WITHOUT A SEPARATE LIGHT METERING CIRCUIT

RELATED MATTERS

This application is a continuation of Ser. No. 12/146,218, filed on Jun. 25, 2008, entitled "Determining a Final Exposure Setting Automatically for a Solid State Camera Without a Separate Light Metering Circuit", which is a continuation of Ser. No. 10/304,838, filed on Nov. 25, 2002, now U.S. Pat. No. 7,403,222, which is a continuation application of Ser. No. 09/294,851, filed on Apr. 20, 1999, now U.S. Pat. No. 6,486,915.

FIELD OF THE INVENTION

This invention is generally related to solid state cameras, and more particularly to techniques for determining exposure parameters in such cameras.

BACKGROUND

Solid state cameras, just like the conventional film camera, are limited in their ability to take pictures which faithfully replicate the full range of colors and brightness in a scene. This is because natural scenes exhibit a wide dynamic range, i.e., some regions of a scene are very bright while others are very dark. As a result, conventional solid state cameras, and particularly consumer products such as digital cameras and video cameras, have a number of adjustable exposure parameters that control the sensitivity of a camera imager. The best pictures are usually taken after the camera's exposure parameters have been adjusted according to the amount of light in the scene. For instance, if the scene is relatively bright, then the exposure, e.g., the period of time the camera imager is allowed to "sense" the incident light, is accordingly reduced so as to better capture the brightness variations in the scene. In conventional solid state cameras, a separate light meter sensor and associated circuitry are used to quickly give an immediate luminance reading of the scene prior to adjusting the exposure parameters and then taking the picture. However, both the light metering circuitry and the camera imager must be calibrated, at the time of manufacturing the camera, to a reference light source. Otherwise, the technique may not yield the proper exposure parameters.

There is a limited conventional technique for determining the optimal exposure that does not use a separate light metering circuit. In that technique, the camera is equipped with a means for providing a histogram of the captured scene at a given exposure setting. The histogram shows a distribution of pixel values obtained by the imager at the selected exposure setting. A person can then manually change the exposure setting and then visually evaluate another histogram of the scene using the new exposure setting. The exposure setting is repeatedly adjusted in this way until the optimal distribution of pixels has been obtained, and then the picture is taken using this optimal exposure setting. This technique suffers, however, when implemented in commercial solid state cameras, because it is too slow and is not automatic for the average consumer who likes the point and shoot convenience of automatic cameras.

SUMMARY

According to an embodiment of the invention, a method is disclosed for automatically generating a final set of exposure parameters for a solid state camera having a camera imager, without using a light metering circuit separate from the camera imager. An iterative automated search methodology is used to arrive at the final set of exposure parameters from an initial exposure setting, and sample captures of the scene are evaluated at each trial exposure setting.

In a particular embodiment, the method of generating the final exposure setting includes selecting one of a number of predetermined exposure settings as a current exposure setting for the solid state camera. A captured scene is then generated by the camera imager using the current exposure setting. In response to the captured scene being underexposed or overexposed, another one of the exposure settings is selected to be the current setting according to the automated search methodology. The two latter steps are repeated until the captured scene is neither underexposed or overexposed. The search methodology performs a coarse granularity search so long as the captured scene is either grossly overexposed or grossly underexposed, and a fine granularity search otherwise.

Other features and advantages of the invention will be apparent from the accompanying drawings and from the detailed description that follows below.

BRIEF DESCRIPTION OF THE DRAWINGS

The invention is illustrated by way of example and not by way of limitation in the figures of the accompanying drawings in which like references indicate similar elements and in which:

FIG. 5 shows a histogram that is centered in.

FIG. 7 shows a pixel "bucket" with relative amounts of noise and signal being identified.

FIG. 8 illustrates exemplary sets of exposure parameters for determining the relationship between noise and the exposure parameters of a solid state camera.

FIG. 9 shows a plot of noise values measured for different integration times, and a best linear fit to such values.

DETAILED DESCRIPTION

An embodiment of the invention is directed to a method for automatically determining an optimal exposure setting prior to taking each picture using a solid state camera. The method may be used to determine the proper exposure setting when initiated by a person pressing a camera's shutter button down at least half-way. The final setting is selected from a number of previously determined exposure parameters using a multi-tiered automated search methodology. These parameters may be general and not specific to any particular camera, or they may be customized for the particular camera. The individual exposure parameters can be determined by those of ordinary skill in the art by conventional exposure calculations. Several tests are given here to evaluate the effectiveness of each selected exposure setting, based on a statistical analysis of a sample capture of the scene using that setting. A technique is given that computes the expected noise level for various exposure settings, based on relationships between noise and exposure parameters determined at each power-up of the camera. Use of this expected noise level helps achieve speedy and accurate determination of the optimal exposure.

In these embodiments, the invention presents a further advantage in that it reduces manufacturing cost of the camera by eliminating a light metering circuit separate from the camera imager. Also, use of the camera imager for both capturing the final picture and determining the optimal exposure eliminates calibration steps that would normally be required to characterize the light metering circuit and the camera imager at the time of manufacturing the camera. This is in part because the sample captured scenes used to determine the exposure setting are obtained through the same imaging data path for the final picture. Thus, the signal level in the final picture will be the same as the signal level in the sample captured scene and is, therefore, properly accounted for when determining the optimal exposure setting. An additional advantage of certain embodiments of the invention is that they enable the signal to noise ratio of the final picture to be optimized for ambient temperature conditions, so that the full capability of the camera is realized.

Figure 1:
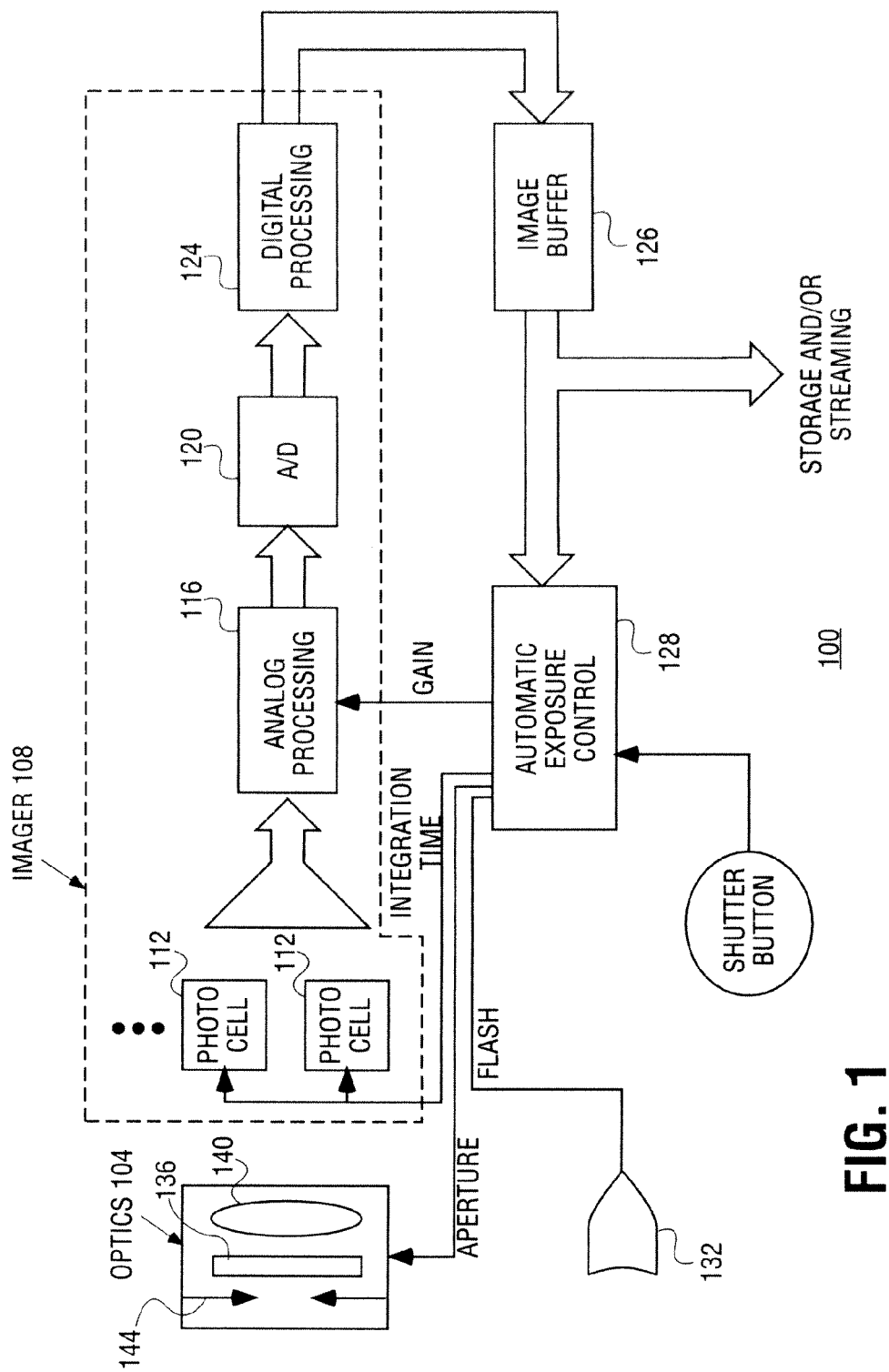
FIG. 1 illustrates a block diagram of an imaging apparatus according to an embodiment of the invention.

FIG. 1 illustrates an imaging apparatus 100 according to one or more embodiments of the invention. The apparatus 100 includes optics 104 that has a conventional aperture, filter, and lens system used to guide the incident light into the camera and onto an imager 108. The imager 108 includes a number of photocells 112 normally arranged as a sensor array and located at a focal plane of the optics 104. Each photocell 112 normally outputs an analog pixel intensity value. These pixel values may then be subjected to analog processing 116 before being forwarded to an analog-to-digital (A/D) converter 120. The analog pixel values are then digitized by the A/D converter 120 and may be subjected to digital processing 124 before being provided as a video data stream, or as still images for storage in electronic image file format. These constituent components of the imager 108 may, of course, be implemented in a variety of different ways. For instance, the photocells 112 and the analog processing 116 may be part of the same integrated circuit die. If allowed by the die manufacturing process, the A/D converter 120 and the digital processing 124 may also be integrated onto the same die. This may be particularly desirable if the entire imager 108 is implemented using a complimentary metal oxide semiconductor (CMOS) fabrication process. Alternatively, the digital processing 124 may be implemented separately from the photocells 112 where, for instance, the photocells 112 are based on charge coupled device (CCD) technology. In general, the exposure control techniques described here may be implemented using a wide range of technologies for the imager 108.

The imager 108 and the optics 104 are under the control of automatic exposure control block 128. The automatic exposure control block 128 evaluates digitized pixel values for one or more sample captured scenes, and in response determines the appropriate exposure setting. Each exposure setting is defined by a number of exposure parameters. These include aperture size for the optics 104, one or more integration times applied to the photocells 112, a gain value (normally an analog gain value provided to the analog processing 116), and a flash signal to a strobe 132 used to further illuminate the scene. The exposure setting may be a combination of one or more of these parameters and perhaps additional parameters that may need to be controlled to provide the best quality picture, as recognized by one of ordinary skill in the art.

The integration time defines the amount of time that a photocell 112 is allowed to detect incident light. Depending on the particular technology used for the photocell, the integration time may be implemented in various different ways. For instance, in a photocell 112 implemented as part of a CMOS active pixel sensor, the integration time is the interval between the moment at which a photodiode is isolated, such that its voltage is allowed to decay in response to the incident light, and the point at which the photodiode voltage is read by external circuitry.

The gain parameter sets the analog voltage and/or current gain to be applied to the pixel values prior to their being digitized by the A/D converter 120. In addition or as an alternative to analog gain, a digital gain applied by the digital processing 124 may be controlled by the gain parameter.

The aperture parameter controls the amount of incident light that enters the optics 104. A wide range of different automated aperture mechanisms may be used to provide the desired range of F-stops. Alternatively, the aperture may be fixed as in certain low-cost consumer cameras.

The analog processing 116 may include correlated double sampling circuitry, as well as any gain and filtering needed to translate the analog pixel values into the proper input values required by the A/D converter 120. The output range of the A/D converter 120 is typically fixed, such as 0-255 for an 8-bit converter, and the entire range of analog pixel values are mapped into digitized pixel values in this range. The digital processing 124 may be used to format the digitized pixel values into a form accepted by the automatic exposure control block 128. Normally, the exposure control techniques of the invention, and in particular those in which an expected noise value is computed, are applied to raw pixel values, which are not yet subjected to dark current noise reduction or any image processing algorithms. However, it is also possible to use pixel data that has been converted to luminance or other color filter array interpolated formats.

The automatic exposure control block 128 may be implemented as processor instructions on a machine-readable medium such as a semiconductor memory, as dedicated hard-wired logic for greater speed of execution, or as a combination of the two. In a particular embodiment of the invention, the imager and the optics form an electronic camera, such as a digital camera, while the exposure control block 128 is implemented by software loaded into a separate data processing device which is not exclusively a stand-alone camera, such as a personal computer. Alternatively, the exposure control block may be integrated in the electronic camera.

Figure 2:
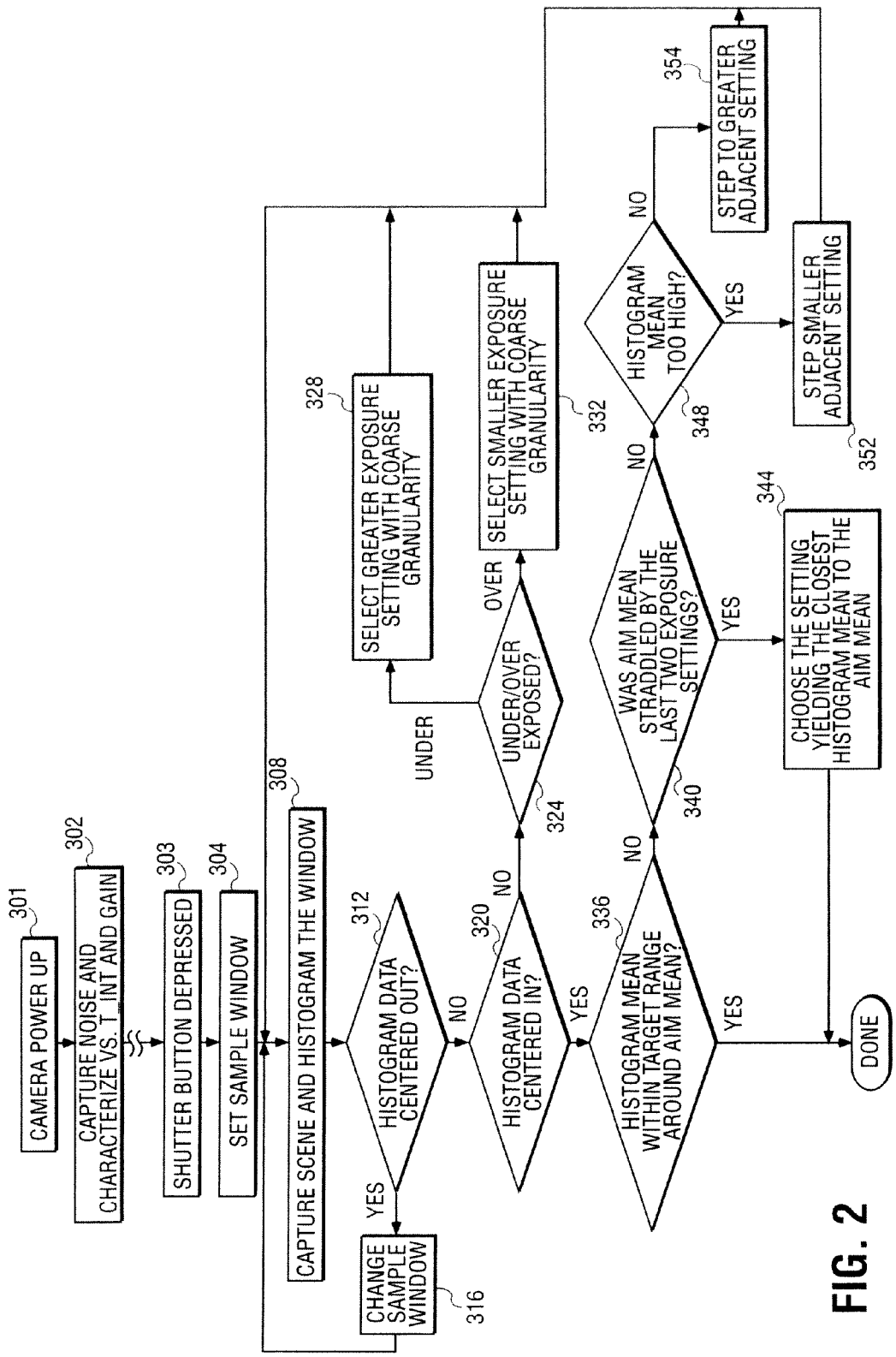
FIG. 2 illustrates a flow chart for determining the optimal exposure setting according to an embodiment of the invention.
Figure 3:
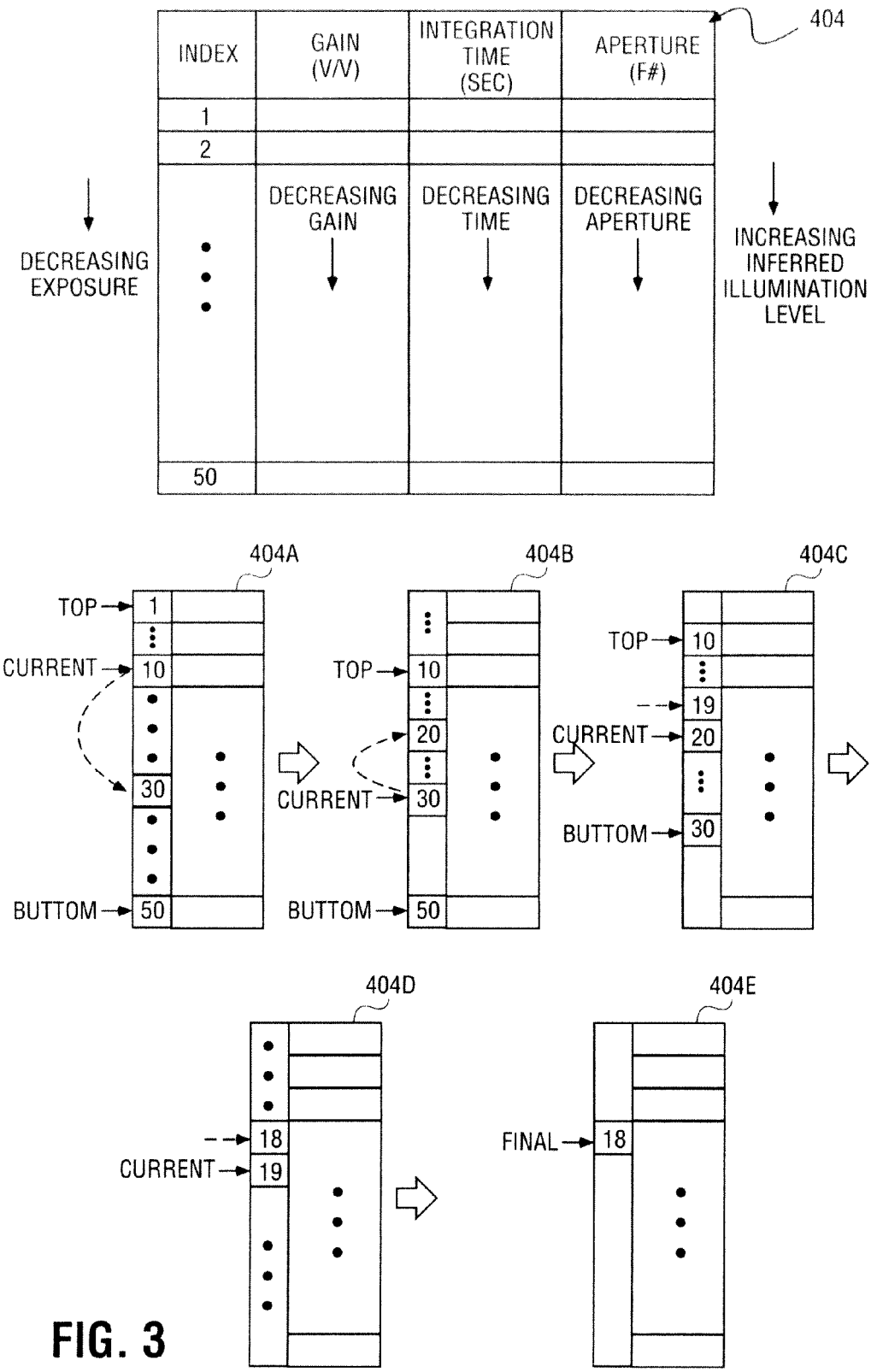
FIG. 3 depicts a table of predetermined exposure settings and an application of the binary chop search methodology using this table to determine the optimal setting.

A particular methodology to be followed by the exposure control block 128 is shown as a flow chart in FIG. 2. FIG. 2 illustrates an embodiment of the invention that provides an approach to determining the optimal exposure, in conjunction with FIG. 3. FIG. 3 shows a table-based coarse and fine granularity search strategy. In this embodiment, a lookup table contains a number of predetermined exposure parameters for each exposure setting, where each exposure setting may correspond to a given illumination level. In this example, there are 50 exposure settings that have been predetermined and are arranged with decreasing exposure as shown. Each exposure setting may have an index value, a gain value, an integration time, and an aperture size. Operation begins here with step 301 in FIG. 2 when the camera is powered up. In step 302, the noise in the captured raw pixel values is characterized as a function of integration time (T_int) and gain in the imaging data path. Techniques for determining this noise will be described below. For now, it is sufficient to recognize that this noise will be used to set an expected value and an exposure aim value for subsequent captures, prior to analyzing each capture for underexposure or overexposure.

Figure 4:
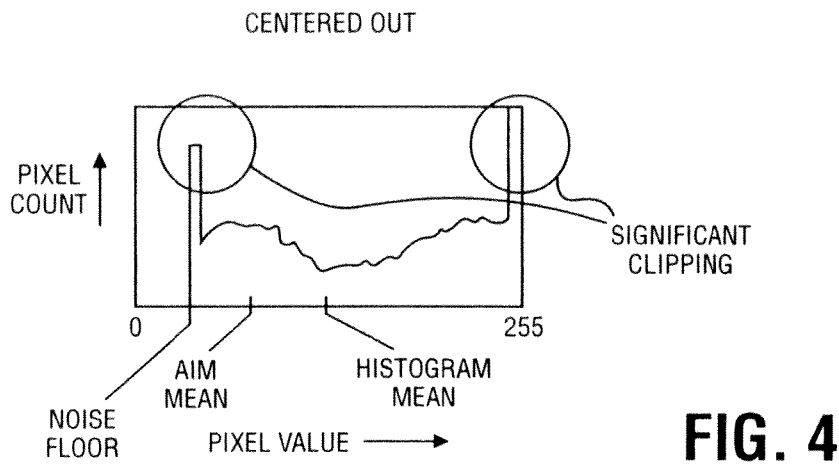
FIG. 4 shows a histogram of pixel values in a captured scene that is centered out.

When the user has aimed the camera at the desired scene and starts to depress the shutter button in step 303, operation continues with step 304 in which a sample window of pixels having a camera system-defined position and size is defined. The sample window will initially encompass all of the scene. Operation then continues with step 308 in which the initial capture is made with exposure parameters associated with a default exposure setting/illumination level. The image from this captured sample window is then histogrammed. Operation continues thereafter with any one of steps 312, 320 or 336. For this example only, operation continues with step 312, in which the test is whether the histogram data is "centered out." An example of what is meant by centered out is shown in FIG. 4, where the pixel values are spread across the full range but are "clipped" at the minimum (noise floor) or maximum ($2^N$, where $N$ is the number of bits provided by the A/D output). Clipping occurs when, for instance, 5% of the total number of pixels in the sample window have the maximum or minimum value. Test 312 will also fail if the sample window is already at the minimum size allowed.

If the test in step 312 is true, then this means that the imager's dynamic range is far too small to capture the whole scene's dynamic range. Thus, the current sample window may not be the best window to determine the optimal exposure setting for this particular scene. In this case, operation will proceed with step 316 in which the sample window is reduced to concentrate effort on determining a final exposure for the main subject, which is likely positioned in the center of the scene. This change may be beneficial in that it might exclude certain peripheral elements in the scene which may be less important to render with detail, such as, for instance, the sun in the sky. For instance, making the sample window smaller and centered over the captured scene is generally appropriate for most consumer applications, as consumers tend to center the subject of interest when taking a picture. The reduction in window size is allowed until the size reaches a predetermined minimum. After changing the window, operation then loops back to step 308 where a histogram is performed of the new sample window and the test in step 312 is repeated.

Figure 5:
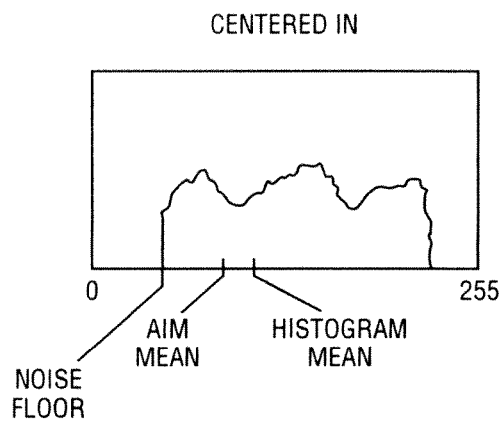
Figure 6:
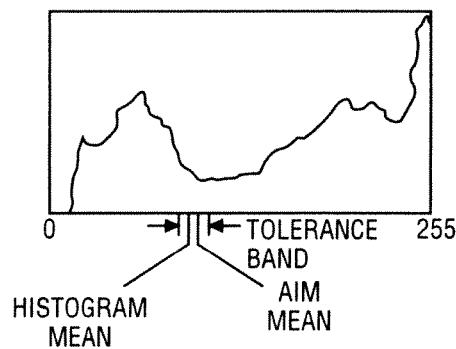
FIG. 6 illustrates a histogram that may be considered optimal.

If the test in step 312 is not true, then the next test may be step 320 to determine whether the histogram data is "centered in," as shown in FIG. 5. The term centered in may loosely describe a histogram in which the pixels are spread across a significant portion of the full A/D converter range and exhibit no significant clipping, if any, at either extreme. If the histogram is not centered in, then the next exposure setting will be selected based on an efficient table search strategy with coarse granularity (see FIG. 3). For example, the binary chop is known to be a highly efficient coarse granularity search technique. In that case, operation proceeds with step 324 in which the captured scene, and, in this particular embodiment, data from just the sample window, is evaluated to determine whether the current exposure setting yielded a capture that is underexposed, i.e., too dark. An underexposed scene means that the histogram will show few, if any, mid or light tones. This may occur, for instance, if the maximum value in the histogram is less than an aim mean value for the histogram. If so, then the next exposure should be greater, i.e., longer integration time, increased gain and/or aperture size. If underexposed, then operation proceeds with step 328 in which the search algorithm is applied to select a greater exposure setting.

Returning to step 324, if the capture has few, if any, mid or dark tones, such as when the minimum histogram value is greater than the aim mean, then the image is overexposed. In a particular embodiment of the invention, this aim mean is 18% of the maximum digitized signal range, i.e., noise value+ ($2^N$-1-noise value)*0.18. This is based on the assumption that the optimal exposure setting for the scene is the same as that needed to properly expose an equivalent 18% gray card, under the same lighting as the scene being captured. If overexposed, then operation proceeds with step 332, such as by performing a binary chop of the current index range (between top and bottom) as in table 404a, and then resetting the range, as shown in table 404b (FIG. 3).

Returning now to decision step 320, if the centered in test is true, then the current exposure setting resulted in a capture that is neither grossly overexposed or grossly underexposed. In addition, if preceded by test 312 for "centered out," this will also mean that any clipping at the outer limits of the histogram is either not an issue or has been addressed to the best of the system's ability. As a result, the search methodology for the next exposure setting changes from coarse granularity to fine granularity, beginning with step 336.

In step 336, the histogram is further tested to determine whether the histogram mean is within the allowable tolerance of the aim mean. If this test is true, then the optimal exposure setting has been found, such that the final picture may be taken using this setting. If, however, the test in step 336 is not true, then operation continues with step 340 in which the mean of the current histogram and the mean of a histogram of a previous capture are compared to the aim mean. If the aim mean is straddled by the mean values of the current and previous captures, then operation continues with step 344 in which the exposure setting that yielded the histogram mean being closest to the aim mean is chosen to be the optimal setting. The straddling of the aim mean may occur if the captured scene, and in particular the sample window, has exceedingly high contrast. The tolerance around an 18% aim mean value may be selected by one of ordinary skill in the art following an error budget analysis to determine the best exposure tolerance bands. For digital cameras having imagers built using metal oxide semiconductor (MOS) fabrication processes and 8 bit digitized pixel values, an aiming for less than ¼ exposure value (EV) error and given a black level (noise floor) of 54 A/D units, an aim mean of 90 units may be selected with a tolerance of +/−6 A/D units.

If the outcome of the straddle test in step 340 is false, then the histogram mean using the current exposure setting is compared to the aim mean of the histogram. If the histogram mean is greater than the aim mean, i.e., overexposed, then the exposure setting index is incremented to the next adjacent (higher) inferred illumination level and its corresponding exposure setting. If the histogram mean is less than the aim mean, i.e., underexposed, then the index is decremented to the next adjacent (lower) inferred illumination level and its corresponding exposure setting (see FIG. 3, table 404c). Operation then loops back to step 308 where another capture of the scene is made using the new exposure setting.

FIG. 3 shows the use of coarse and fine granularity searches in a list of exposure settings to determine the optimal exposure. In this embodiment, a lookup table is created that contains a number of exposure parameters for each exposure setting. In this example, there are 50 exposure settings that have been predetermined and are arranged in decreasing exposure as shown. Each setting may be defined by a gain value, an integration time, and an aperture size. Other exposure attributes, such as flash use, may also be included. Operation will begin with selecting a current exposure setting at the index position 10. The camera will then obtain the gain, integration time and aperture size associated with index 10 in the lookup table. A capture of the scene using this current exposure setting will then be executed and evaluated. Rather than selecting the initial exposure setting as the halfway point between the top and bottom of the table, the initial setting is selected slightly closer to the top, because the integration times in the upper half of the table are longer than those in the lower half of the table, so that a completed search using an initial exposure setting from near the top of the table will consume a more uniform amount of time for any possible illumination level.

Thus, with the current setting at index 10 yielding an overexposed scene, a binary chop is performed to select the next setting at index 30, which is halfway between a current setting and the bottom of the table. The scene is then captured again using the new current setting at index 30. Note that the top boundary of the range of exposure settings in Table 404(*b*) is now at index 10. If the current exposure setting at index 30 results in an underexposed scene, then the binary chop will pick the point halfway between index 10 and index 30, which is index 20. In Table 404(*c*), the current setting is now at index 20. Assume now that the current setting at index 20 results in a capture of the scene having a centered in characteristic, as determined by its histogram. This means that the captured scene is only mildly over- or underexposed, such that the binary chop algorithm should be abandoned in favor of an incremental step to the next adjacent exposure setting. Thus, if the histogram data indicates that the current captured scene is still underexposed, then the exposure setting index is decremented from 20 to 19, as shown by the pointers in Table 404(*d*). Once again, if the captured scene using the current setting at index 19 is still underexposed, then the setting index is decremented to 18. Finally, if the histogram mean of the captured scene obtained using the current setting at index 18 is within the tolerances surrounding the aim mean, then the optimal exposure setting is found, as indicated in Table 404(*e*).

The inventors have discovered that it is useful to switch from coarse granularity to fine granularity, while searching for the final exposure among a number of predetermined exposure settings, when the current capture of the scene becomes under- or overexposed at a relatively mild level. Otherwise, continued use of coarse granularity for selecting the next exposure setting may not converge to the final setting. The failure of a course granularity search such as the binary chop may occur because the mean of the pixel values in each capture shifts with different exposure levels. When the scene dynamic range exceeds what a camera may capture, pixels will be clipped at the maximum and minimum A/D boundaries. As different exposures change the amount of incoming light, some clipped pixels at one A/D extreme will no longer be clipped. This, in turn, affects the histogram's mean value which is an input parameter of the binary chop technique. Because this input parameter changes in an inexact, unpredictable manner with different exposures, the binary chop will fail to converge for some scenes.

The embodiments of the invention described above utilize the concept of an aim mean that is compared to a histogram mean to help determine when the search methodology should switch from coarse granularity to fine granularity and also when the captured scene is over or underexposed. In a particular embodiment of the invention, the aim mean is replaced with a "dynamic" aim mean that is computed as a function of each exposure setting. A dynamic aim mean as defined here is a noise-dependent variable that is computed for each captured scene, based on the current exposure setting. The possible sources of noise that may be taken into account when determining the dynamic aim mean are illustrated in FIG. 7. This figure shows a pixel "bucket" showing the relative amounts of the different types of noise that are captured in a conventional digital camera. These types contribute to the aforementioned noise floor and should be considered when determining a formula for the noise floor. In a particular embodiment of the invention, the dynamic aim mean is defined as follows:

$$\text{Dynamic Aim Mean} \triangleq (18\%)(2^N - 1 - \text{Dynamic Mean Noise}) + \text{Dynamic Mean Noise}$$

where the Dynamic Mean Noise is defined as the expected mean of the noise floor (a function of integration time and gain, see below). In the example given in this disclosure, N=8 bits.

The inventors have determined that the final exposure setting for taking a picture using a digital camera may be found relatively quickly using the above-described automated methodology when the histogram mean is compared to a dynamic aim mean computed for each given exposure setting. In a further embodiment of the invention that uses the dynamic aim mean, mathematical relationships that define a noise variable as a function of different exposure parameter variables are determined. These relationships may be linear (y=ax+b, where y is noise and x is the exposure parameter) or may alternatively be of higher order if needed to more accurately describe the relationship. They can be determined by fitting a curve or line to the measured test data, as shown in the example of FIGS. 8 and 9. FIG. 8 shows a set of exposures that will be captured with the shutter in the closed condition to assess the camera's noise level at the current temperature. Note that the series of exposure parameters in FIG. 8 have an integration time series at a fixed gain and a gain series at fixed integration time. The time series is used to derive a general relationship for noise vs. integration time. This can be done linearly, as illustrated in FIG. 9, or as a higher order regression as needed. The test data may be gathered from a set of closed shutter captures (dark frames) obtained at the ambient temperature at which the final picture is to be taken. The closed shutter captures can be obtained upon camera power-up as illustrated in FIG. 2 step 302 or at any other convenient time, normally prior to the user depressing the shutter button to take a picture. By using such predefined mathematical relationships between the noise floor and the various exposure parameters, there is no need to capture and process any dark frames each time a picture of a new, different scene is taken, thus promoting a speedier determination of the final exposure. The mathematical relationships for the present embodiments include noise vs. pixel integration time, N(Tint), and noise vs. gain in the imaging data path prior to digitization, N(G). For instance, if the N(Tint) line is described by a linear fit, $N(Tint)=a_3*T+b_1$, and if the N(G) line is described by $N(G)=a_5*G+b_2$, then the dynamic mean noise can be given by:

$$\text{dynamic mean noise} \propto a_3*T\_\text{integration}+a_5*\text{gain}+b_5$$

where $b_5=b_1+b_2$ and where proportionality constants have been omitted. By using such predetermined mathematical formulas to determine the noise floor, the dynamic mean noise, and the dynamic aim mean as a function of each trial exposure setting, a more accurate determination of the exposure setting may be obtained. Use of such a technique also allows the dynamic range of the scene to be mapped onto the camera's available dynamic range.

To summarize, various embodiments of the invention as a method for determining a final exposure setting automatically for a solid state camera without a separate light metering circuit have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, the exposure determination techniques described above may be applied to a wide range of solid state cameras, including video cameras. Also, the invention is not limited to the centered in and centered out tests described above. One of ordinary skill in the art after having read this disclosure may be able to develop alternative tests for determining when a series of captures change from being grossly overexposed or grossly underexposed to being only mildly so. The specification and drawings are, accordingly, to be regarded in an illustrative rather that a restrictive sense.

What is claimed is:

1. A method for generating an exposure setting, comprising:
    a) selecting one of a plurality of predetermined exposure settings as a current exposure setting for a camera having a camera imager;
    b) generating a captured scene by the camera imager using the current exposure setting;
    c) selecting according to an automated search methodology another one of the exposure settings to be the current setting in response to determining the captured scene as being underexposed or overexposed; and
    d) repeating b) and c) until the captured scene is neither underexposed or overexposed, wherein the search methodology performs a coarse granularity search so long as the captured scene is either grossly overexposed or grossly underexposed, and then changes to a fine granularity search if the captured scene is still overexposed or underexposed but not grossly so, wherein the search methodology changes from coarse to fine when a histogram of the captured scene is determined to indicate that pixels are spread substantially across a full A/D converter range without substantial clipping at either extreme of the range.

2. The method of claim 1 wherein the determination of whether the captured scene is under or overexposed during the fine granularity search methodology is made by comparing captured pixels, using the current exposure setting, to a function that is defined to be of a noise variable representing noise in an imaging data path of the camera imager.

3. The method of claim 2 wherein the noise variable is defined as a noise function of one or more exposure parameters, the function being determined by analyzing pixel values in a plurality of dark frame portions captured by the camera under different exposure settings.

4. The method of claim 3 wherein the noise function is determined upon camera power-up, before the camera is ready to take pictures, when the plurality of dark frame portions are captured and histogrammed, an arithmetic mean is computed for each histogram, and an equation that relates the noise variable to said exposure parameters is fitted to data points derived from the arithmetic mean computation.

5. The method of claim 1 wherein the plurality of predetermined exposure settings are arranged in a monotonic sequence.

6. The method of claim 1 wherein each exposure setting is in part defined by a set of exposure parameters for the camera, the exposure parameters including a gain applied in the imaging data path.

7. The method of claim 6 wherein the gain is applied to analog pixel signals prior to their being digitized.

8. A method for generating an exposure setting, comprising:
    a) selecting one of a plurality of predetermined exposure settings as a current exposure setting for a camera having a camera imager;
    b) generating a captured scene by the camera imager using the current exposure setting;
    c) selecting another one of the exposure settings to be the current setting in response to determining the captured scene as being underexposed or overexposed; and
    d) repeating b) and c) in response to the captured scene being determined to be underexposed or overexposed, wherein the selecting is in accordance with a coarse granularity search so long as the captured scene is either grossly overexposed or grossly underexposed, and then changes to a fine granularity search if the captured scene is still overexposed or underexposed but not grossly so, wherein the coarse granularity search is performed, so long as a histogram of the captured scene is determined to be not centered in, wherein the histogram is centered in when its pixels are spread substantially across a full A/D converter range without substantial clipping at either extreme of the range.

9. The method of claim 8 wherein the determination of whether the captured scene is under or overexposed during the fine granularity search is made by comparing captured pixels, using the current exposure setting, to a function that is defined to be of a noise variable representing noise in an imaging data path of the camera imager.

10. The method of claim 9 wherein the noise variable is defined as a noise function of one or more exposure parameters, the function being determined by analyzing pixel values in a plurality of dark frame portions captured by the camera under different exposure settings.

11. The method of claim 10 wherein the noise function is determined upon camera power-up, before the camera is ready to take pictures, when the plurality of dark frame portions are captured and histogrammed, an arithmetic mean is computed for each histogram, and an equation that relates the noise variable to said exposure parameters is fitted to data points derived from the arithmetic mean computation.

12. The method of claim 8 wherein each exposure setting is in part defined by a set of exposure parameters for the camera, the exposure parameters including a gain applied in the imaging data path.

13. A device including a digital camera, comprising:
    an imager;
    a processor;
    memory in communication with the processor, wherein the memory stores instructions which when executed by the processor cause the device including the digital camera to
        select one of a plurality of predetermined exposure settings as a current exposure setting for the digital camera,
        generate a captured scene by the imager using the current exposure setting, and
        select another one of the exposure settings to be the current setting in response to the captured scene being underexposed or overexposed in a center window of the captured scene; and
    processing electronics to automatically generate a final exposure setting without using a light metering circuit separate from the imager, wherein for the current exposure setting selected from the plurality of predetermined exposure settings that are arranged from the one corresponding to the least exposure to the one corresponding to the greatest exposure,
- a) the imager is to provide pixel values defining the captured scene using the current setting, and
- b) the processing electronics is to select according to an automated search methodology another one of the plurality of exposure settings to be the current setting in response to the captured scene being underexposed or overexposed, and wherein a) and b) are to repeat until the captured scene is neither underexposed or overexposed as determined using the pixel values defining the captured scene, where the automated search methodology is to perform a binary chop of the exposure settings so long as the captured scene is either grossly overexposed or grossly underexposed, and then changes to a fine granularity search if the captured scene is still overexposed or underexposed but not grossly so.

14. The device including a digital camera of claim 13, wherein the processing electronics is to initially select another one of the exposure settings with coarse granularity if (1) there are relatively few pixels in the captured scene, using the current exposure setting, that have a substantial value, or (2) there are many pixels in the captured scene that have a maximum value, and then with fine granularity until the captured scene is neither underexposed or overexposed as determined using the pixel values.

15. The device including a digital camera of claim 13, wherein the search methodology performs the binary chop so long as (1) there are few pixels in the captured scene, using the current exposure setting, that have at least a noise value, or (2) there are many pixels in the captured scene that have a minimum or a maximum value, and otherwise performs a step to an adjacent setting from the current exposure setting when selecting another one of the exposure settings.

16. The device including a digital camera of claim 13, wherein the processing electronics is to determine that the captured scene is underexposed if an average value of pixels in a histogram of a portion of the captured scene is less than an aim mean value.

17. The device including a digital camera of claim 16, wherein the aim mean value is computed as a function of one or more exposure parameters that define the current exposure setting.

18. The device including a digital camera of claim 17, wherein the function is determined by analyzing pixel values in a plurality of dark frame portions captured by the digital camera under different exposure settings to determine a mathematical relationship between a noise variable and one or more exposure parameters.

19. The device including a digital camera of claim 13, wherein the imager includes an image sensor array and associated analog and digital signal processing circuitry that provide the pixel values.

20. The device including a digital camera of claim 19, wherein the image sensor array and the associated signal processing circuitry are integrated on the same semiconductor die.

21. The device including a digital camera of claim 13, wherein the memory contains instructions which when executed by the processor cause the automatic generation of an optimal exposure setting.

* * * * *